UNITED STATES PATENT OFFICE 2,624,739

ALPHA,ALPHA DIARYL PIPERIDINO METHANOLS

Harold W. Werner, Sharonville, and Charles H. Tilford, Silverton, Ohio, assignors to The Wm. S. Merrell Company, Cincinnati, Ohio, a corporation of Delaware No Drawing. Application November 23, 1949, Serial No. 129,182

3 Claims. (Cl. 260—294.7)

This invention relates to new chemical compounds which are useful stimulants for the central nervous system.

These compounds are derivatives of alpha-(2-piperidyl)-benzyl alcohol or certain homologues thereof and are comprehended by the generic formula

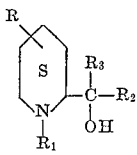

in which the nitrogen-containing ring is saturated as signified by S (that is, is a piperidine ring), R and $R_1$ are hydrogen atoms or the methyl or ethyl radicals and are alike or different, $R_2$ is the methyl, ethyl or phenyl radical or a tolyl or methoxyphenyl radical, and $R_3$ is the phenyl or a tolyl radical.

The new compounds may in general be prepared by reduction of the corresponding pyridine compounds, the N-alkyl compounds being obtained by the introduction of a methyl or ethyl radical into the corresponding compound in which $R_1$ of the generic formula is hydrogen. These features are illustrated by the following specific examples, which are not limitative.

*Example I.—Alpha,alpha-diphenyl-2-piperidinemethanol.*—A mixture of 48 grams (0.167 mole) of alpha,alpha-diphenyl-2-pyridinemethanol hydrochloride (Emmert et al., Ber. 72B, 1188 (1939); 74B, 714 (1940), 160 ml. of ethanol, and 0.5 gram of Adams' platinum catalyst was shaken under an initial hydrogen pressure of 60 pounds. The theoretical amount of hydrogen was absorbed in 5 hours. The reaction mixture was refluxed, diluted with enough water to dissolve all the white solid, and filtered hot from the catalyst. The filtrate was cooled and filtered; yield: 38 grams of white product melting at 308–309° with decomposition.

Anal. calcd. for $C_{18}H_{21}ON.HCl$: Cl, 11.75. Found: Cl, 11.85.

*Example II.—Alpha,alpha-diphenyl-1-methyl-2-piperidinemethanol hydrochloride.*—A mixture of 3.5 grams (0.013 mole) of the above alpha,-alpha-diphenyl-2-piperidinemethanol, 4 grams (0.05 mole) of formaldehyde (37%), and 6 grams (0.1 mole) of formic acid was refluxed for 2 days. The reaction mixture was treated with 1.3 grams (0.013 mole) of conc. hydrochloric acid and vacuum distilled on the steam bath. The residue was recrystallized from butanone to give the desired product which melted at 228–229° (dec.).

*Example III.—Alpha-phenyl-alpha-methyl-2-piperidinemethanol.*—A solution of 30 grams (0.13 mole) of alpha-phenyl-alpha-methyl-2-pyridinemethanol hydrochloride in 100 ml. of ethanol was shaken at 70–80° at an initial hydrogen pressure of 50 pounds in the presence of 0.4 gram of Adams' platinum catalyst. The theoretical amount of hydrogen was absorbed in one hour. The mixture was filtered and the filtrate was evaporated on the steam bath. The residue was recrystallized from butanone. The yield of white crystalline hydrochloride was 24 grams (80%); M. P. 182–184°.

*Example IV.—Alpha-phenyl-alpha-methyl-1-methyl-2-piperidinemethanol.*—A mixture of 20 grams (0.1 mole) of the above 2-piperidinemethanol, 32 grams (0.65 mole) of 90% formic acid and 16 grams (0.195 mole) of formalin was refluxed forty-eight hours. The reaction mixture was made alkaline with 30% sodium hydroxide, extracted with benzene, and the benzene extract fractionally distilled through a 20 cm. Vigreux column. The product distilling at 125–129° (0.4 mm.) amounted to 20 grams (91%). A sample was converted to the white crystalline hydrochloride; M. P. 220–221°.

By modification of the procedures of the specific examples in known manner, the other compounds of this invention can be prepared.

The new compounds are basic, and will ordinarily be used in the form of an acid addition salt, i. e., as the hydrochloride, hydrobromide, sulfate, succinate, phosphate, glycolate, acetate, tartrate, levulinate, or the like, by oral administration in the form of tablets or other suitable form. The new compounds may also be administered parenterally, for example, intravenously.

We claim:

1. The compounds of the generic formula

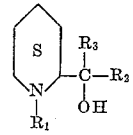

in which S signifies that the nitrogen-containing ring is saturated, $R_1$ is a substituent selected from the group consisting of the hydrogen atom and methyl and ethyl radicals, $R_2$ is a substituent selected from the group consisting of the phenyl, tolyl and methoxyphenyl radicals, and $R_3$ is a substituent selected from the group consisting of the phenyl and tolyl radicals.

2. Alpha,alpha - diphenyl - 2-piperidinemethanol.

3. Alpha,alpha - diphenyl - 1-methyl-2-piperidinemethanol.

HAROLD W. WERNER.
CHARLES H. TILFORD.

REFERENCES CITED

The following references are of record in the file of this patent:

Anker et al.: Chem. Abs., vol. 40 (1946), p. 1836.

Renshaw et al.: Chem. Abs., vol. 33 (1939), p. 3379.

Winterfeld et al.: Chem. Abs., vol. 29 (1935), p. 7331.

Emmert et al.: Ber. Deut. Chem., vol. 72B, pp. 1188–1194 (1939).

Tilford et al.: J. Am. Chem. Soc., vol. 70, pp. 4001–4009 (1948).